United States Patent
Nakao et al.

(10) Patent No.: US 8,978,717 B2
(45) Date of Patent: Mar. 17, 2015

(54) CAP UNIT FOR PUNCTURE REPAIR

(71) Applicant: Sumitomo Rubber Industries, Ltd., Kobe-shi, Hyogo (JP)

(72) Inventors: Yukio Nakao, Kobe (JP); Chou Wen San, An-Din Hsiang (TW)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/345,865

(22) PCT Filed: Sep. 24, 2012

(86) PCT No.: PCT/JP2012/074361
§ 371 (c)(1),
(2) Date: Mar. 19, 2014

(87) PCT Pub. No.: WO2013/047419
PCT Pub. Date: Apr. 4, 2013

(65) Prior Publication Data
US 2014/0224381 A1    Aug. 14, 2014

(30) Foreign Application Priority Data
Sep. 28, 2011 (JP) .................. 2011-213077

(51) Int. Cl.
*B29C 73/16* (2006.01)
(52) U.S. Cl.
CPC .................................... *B29C 73/166* (2013.01)
USPC ............................................. 141/38; 152/415
(58) Field of Classification Search
CPC ..................................................... B29C 73/166
USPC ......... 141/38, 100–105, 65, 67; 152/502, 509, 152/415
See application file for complete search history.

(56) References Cited

U.S. PATENT DOCUMENTS

| | | | |
|---|---|---|---|
| 6,889,723 B2 * | 5/2005 | Gerresheim et al. | 141/38 |
| 7,178,564 B2 * | 2/2007 | Kojima et al. | 141/38 |
| 7,694,698 B2 * | 4/2010 | Marini | 141/38 |
| 7,854,242 B2 * | 12/2010 | Stehle | 141/38 |
| 8,016,002 B2 * | 9/2011 | Yoshida et al. | 141/38 |

(Continued)

FOREIGN PATENT DOCUMENTS

| | | |
|---|---|---|
| EP | 2 186 628 A1 | 5/2010 |
| JP | 2007-168418 A | 7/2007 |

(Continued)

*Primary Examiner* — Timothy L Maust
*Assistant Examiner* — Timothy P Kelly
(74) *Attorney, Agent, or Firm* — Birch, Stewart, Kolasch & Birch, LLP

(57) ABSTRACT

A cap unit is provided with: a cap body having a first flow channel for feeding the compressed air from a compressor into a bottle container, and a second flow channel for sequentially taking out a puncture repair agent and the compressed air from the bottle container; and a first and second inner lids which are independent from one another and which close the first and second flow channels. The cap body has a boss portion extending upward from the bottom surface of a mouth portion securing recess, and provided with a first inner lid securing portion. The first inner lid is fitted into the first inner lid securing portion The upper opening portion of the first flow channel opens further inward than the first inner lid securing portion, and the upper opening portion of the second flow channel opens further outward than the first inner lid securing portion.

5 Claims, 7 Drawing Sheets

(56) References Cited

U.S. PATENT DOCUMENTS

| | | | |
|---|---|---|---|
| 8,020,588 B2 * | 9/2011 | Wang | 141/38 |
| 8,205,645 B2 * | 6/2012 | Dowel | 141/38 |
| 8,297,321 B2 * | 10/2012 | Chou | 141/38 |
| 8,627,857 B2 * | 1/2014 | Chou | 141/38 |
| 8,640,744 B2 * | 2/2014 | Dowel | 141/38 |
| 8,671,995 B2 * | 3/2014 | Chou | 141/38 |
| 8,746,293 B2 * | 6/2014 | Chou | 141/38 |
| 2009/0107578 A1 * | 4/2009 | Trachtenberg et al. | 141/5 |

FOREIGN PATENT DOCUMENTS

| | | |
|---|---|---|
| JP | 2009-023123 A | 2/2009 |
| JP | 2009-023225 A | 2/2009 |
| JP | 2009-029036 A | 2/2009 |
| JP | 2011-131546 A | 7/2011 |
| JP | 3172248 U | 12/2011 |

\* cited by examiner

CAP UNIT FOR PUNCTURE REPAIR

TECHNICAL FIELD

The present invention relates to a cap unit for puncture repair secured to a mouth portion of a bottle container storing a puncture repair agent. With compressed air from a compressor, the cap unit for puncture repair is to sequentially charge the puncture repair agent and the compressed air into a punctured tire to temporarily repair the puncture.

BACKGROUND ART

For example, the following patent document 1 describes a cap unit for puncture repair (b). The cap unit (b) is secured to a mouth portion (a1) of a bottle container (a) as shown in FIG. 8. with compressed air from a compressor (d), a puncture repair agent and the compressed air are sequentially charged into a puncture tire (t) to temporarily repair the puncture.

The cap unit (b) includes a cap body (g) including first and second flow channels (e) and (f), and an inner lid (h) to simultaneously close the first and second flow channels (e) and (f). The first flow channel (e) is the flow channel to feed the compressed air from the compressor (d) into the bottle container (a). The second flow channel (f) is the flow channel to sequentially take out the puncture repair agent and the compressed air from the bottle container (a) by a feed of the compressed air.

Specifically, the cap body (g) includes a securing recess portion (g1) to screw thereto the mouth portion (a1) of the bottle container (a), and a boss portion (g2) extending upward from a bottom surface of the securing recess portion (g1). An outer peripheral surface of the boss portion (g2) defines an inner lid securing portion (j) allowing the inner lid (h) to be elastically fitted thereto. The boss portion (g2) includes upper opening portions (e1) and (f1) respectively for the first and second flow channels (e) and (f), which are disposed further inside than the inner lid securing portion (j). The inner lid (h) integrally includes an inner lid body (ha) and a plug shank portion (hb). The inner lid body (ha) is to be fitted to the outer peripheral surface of the boss portion (g2) (the inner lid securing portion (j)) so as to close the first flow channel (e). The plug shank portion (hb) is to be fitted into the upper opening portion (f1) so as to close the second flow channel (f).

The bottle unit (b) is subjected to on-vehicle storage in a mounted state of being mounted on the bottle container (a). At the time of a puncture repair, the cap unit (b) in the mounted state is to be piped to operate the compressor (d). This allows the compressed air to flow through the first flow channel (e) into the inner lid body (ha). Then, upon an increase in internal pressure of the inner lid body (ha), the inner lid (h) is to automatically disengage. That is, the first and second flow channels (e) and (f) are to be opened.

Accordingly, the inner lid (h) does not need not to disengage during the storage, and needs to easily disengage with the compressed air at the time of the puncture repair. Therefore, enhanced precision in fitting dimension between the inner lid (h) and the cap body (g), and high precision control of an interlocking force between the inner lid (h) and the cap body (g) are respectively required.

However, with the conventional structure, interlocking variations occur in both the inner lid body (ha) and the plug shank portion (hb). Hence, further enhanced precision is needed for the fitting dimension, thus leading to a drop in yield rate and an increase in process costs for a product inspection process.

Additionally, the conventional structure needs simultaneous disengagement in the fitting of the inner lid body (ha) and the fitting of the plug shank portion (hb). When the plug shank portion (hb) is first about to disengage to cause a gap, the compressed air in the inner lid body (ha) leaks from the gap to the second flow channel (f). Consequently, the internal pressure of the inner lid body (ha) stops increasing, and the inner lid (h) does not disengage from the boss portion (g2). On the other hand, when the inner lid body (ha) is first about to disengage to cause a gap, the compressed air leaks from the gap into the bottle container (a). Consequently, the pressure in the bottle container (a) increases to decrease a pressure difference between the inside and outside of the inner lid body (ha). Consequently, also in this case, the inner lid (h) does not disengage from the boss portion (g2). Thus, the inner lid body (ha) and the plug shank portion (hb) need to disengage simultaneously, and this also contributes to the need for high precision.

RELATED ART DOCUMENT

Patent Document

Patent document 1: Japanese Unexamined Patent Application Publication No. 2009-23123.

DISCLOSURE OF THE INVENTION

Problems to be Solved by the Invention

Accordingly, it is an object of the present invention to provide a cap unit for puncture repair capable of relaxing the fitting precision between the inner lid and the cap body while ensuring disengagement of the inner lid, thereby capable of suppressing, for example, a drop in the yield rate of the cap unit and an increase in the process costs for the product inspection process.

Means of Solving the Problems

To solve the above-mentioned problems, the invention of claim 1 is characterized in that a cap unit for puncture repair, the cap unit comprising:

a cap body attached to a mouth portion of a bottle container storing a puncture repair agent, and comprising a first flow channel to feed compressed air from a compressor into the bottle container, and a second flow channel configured to sequentially take out the puncture repair agent and the compressed air from the bottle container by a feed of the compressed air, and closing means for closing the first flow channel and the second flow channel. The closing means comprises a first inner lid configured to close the first flow channel, and a second inner lid being defined independently of the first inner lid and configured to close the second flow channel. The cap body comprises a mouth portion securing recess allowing the mouth portion of the bottle container to be inserted into and secured to the mouth portion securing recess, and a boss portion extending upward from a bottom surface of the mouth portion securing recess, and comprising a first inner lid securing portion permitting elastic fitting of the first inner lid to the first inner lid securing portion. And, wherein an upper opening portion of the first flow channel opens further inward than the first inner lid securing portion of the boss portion, and an upper opening portion of the second flow channel opens further outward than the first inner lid securing portion.

In claim 2, wherein the upper opening portion of the first flow channel is located higher than a liquid surface of the puncture repair agent stored in the bottle container in a mounted state that the bottle container is mounted on the cap unit.

In claim 3, the upper opening portion of the second flow channel is located lower than an upper end of the mouth portion.

In claim 4, the closing means is configured so that the first inner lid disengages to open the first flow channel upon an increase in pressure of the first flow channel with the compressed air from the compressor, and thereafter, the second inner lid disengages to open the second flow channel upon an increase in pressure of the bottle container with the compressed air entering the bottle container from the first flow channel.

Effects of the Invention

With the present invention as described above, the upper opening portion of the first flow channel opens further inward than the first inner lid securing portion disposed on the boss portion. The first inner lid is to be fitted to the first inner lid securing portion so as to close the first flow channel. The upper opening portion of the second flow channel opens further outward than the first inner lid securing portion. The second flow channel is to be closed by the second inner lid that is independent of and different from the first inner lid. It is therefore ensured to firstly disengage only the first inner lid by an increase in pressure of the first flow channel due to the compressed air from the compressor.

Upon the disengagement of the first inner lid, the pressure of the bottle container increases with the compressed air entering therein from the first flow channel. It is therefore also ensured to sequentially disengage the second inner lid by using the increase in the pressure of the bottle container.

The first and second inner lids are thus disposed independently. It is therefore ensured to surely prevent the occasion that the inner lids are disengaged to cause liquid leakage during storage, while relaxing the fitting precision for each of these inner lids so as to suppress the drop in the yield rate of the cap unit and the increase in the process costs for the product inspection process. It is also ensured to surely prevent the occasion that the inner lids do not disengage at the time of use to make a puncture repair operation inoperable.

MODE FOR CARRYING OUT THE INVENTION

An embodiment of the present invention will be described in detail below.

Figure 1:
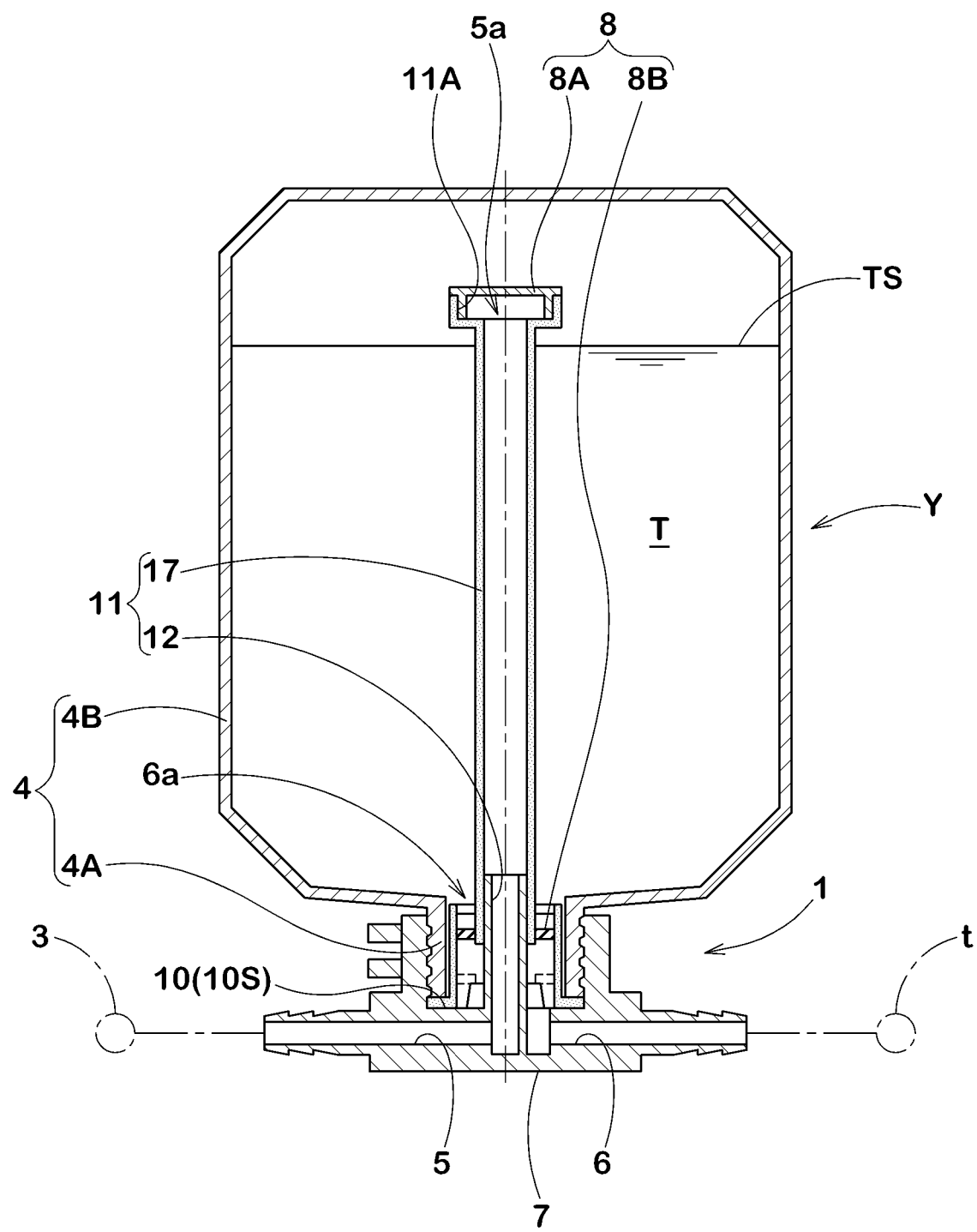
FIG. 1 is a cross-sectional view of an embodiment of a cap unit according to the present invention.

FIG. 1 is a cross-sectional view illustrating a mounted state Y, in which a bottle container 4 is mounted on a cap unit 1 of the present invention. The cap unit 1 includes a cap body 7 including first and second flow channels 5 and 6, and closing means 8 for closing the first and second flow channels 5 and 6. The first flow channel 5 is the flow channel to feed compressed air from a compressor 3 into the bottle container 4. The second flow channel 6 is the flow channel to sequentially take out a puncture repair agent T and the compressed air from the bottle container 4 by a feed of the compressed air.

The closing means 8 includes a first inner lid 8A to close the first flow channel 5, and a second inner lid 8B to close the second flow channel 6. The first inner lid 8A and the second inner lid 8B are defined independently of each other.

The bottle container 4 constitutes a well-known structure including a container portion 4B to store the puncture repair agent T, and a small-diameter cylindrical-shaped mouth portion 4A protruding from a lower end of the container portion 4B so as to take out the puncture repair agent T.

The cap body 7 includes a mouth portion securing recess 10 to secure the mouth portion 4A of the bottle container 4, and a boss portion 11 extending upward from a bottom surface 10S of the mouth portion securing recess 10. The boss portion 11 includes a first inner lid securing portion 11A to permit elastic fitting thereto of the first inner lid 8A. An upper opening portion 5a of the first flow channel 5 opens further inward than the first inner lid securing portion 11A. An upper opening portion 6a of the second flow channel 6 opens further outward than the first inner lid securing portion 11A.

Figure 2:
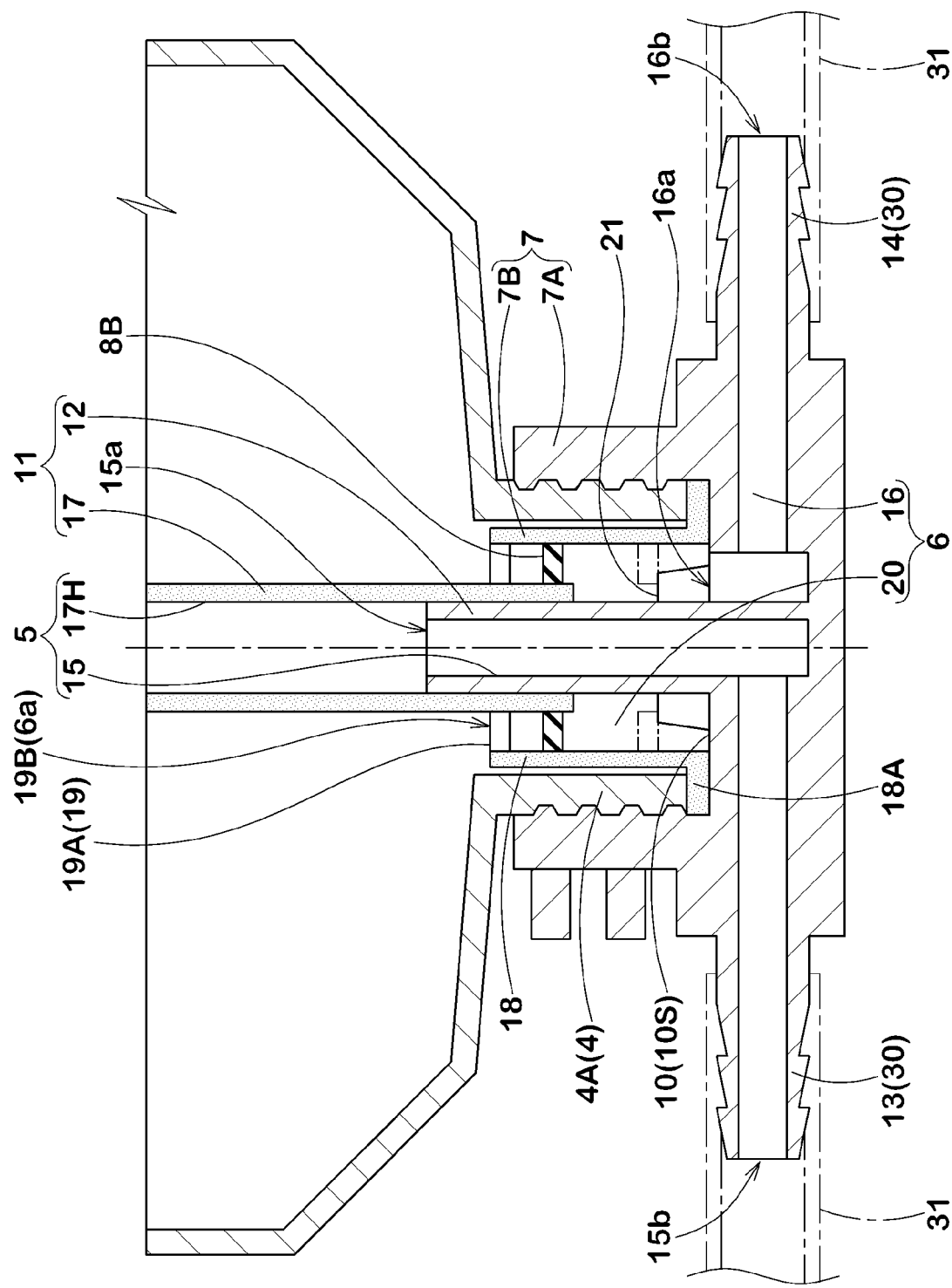
FIG. 2 is an enlarged cross-sectional view of the cap unit.

Specifically, the cap body 7 of the present embodiment is made up of a first cap body portion 7A and a second body portion 7B as shown in enlarged dimension in FIG. 2.

The first cap body portion 7A includes the mouth portion securing recess 10 recessedly disposed at an upper end portion of the first cap body portion 7A, and a base pipe portion 12 extending upward from the bottom surface 10S of the mouth portion securing recess 10. The base pipe portion 12 is coaxial with the mouth portion securing recess 10. The mouth portion securing recess 10 has an inner screw portion on an inner wall surface thereof so as to screw the mouth portion 4A via the inner screw portion into the mouth portion securing recess 10.

A compressor coupling portion 13 to couple the compressor and a tire coupling portion 14 to couple a tire are disposed on a side portion of the first cap body portion 7A. The present embodiment illustrates the case where the compressor coupling portion 13 and the tire coupling portion 14 are defined as a hose coupling portion 30, and are respectively coupled via a hose 31 with the compressor 3 and the tire (t).

Hole portions 15 and 16 are defined in the first cap body portion 7A. One end 15b of the hole portion 15 communicates with the tip of the compressor coupling portion 13, and another end 15a communicates with the upper end of the base pipe portion 12. One end 16b of the hole portion 16 communicates with the tip of the tire coupling portion 14, and another end 16a communicates with the bottom surface 10S.

Figure 3:
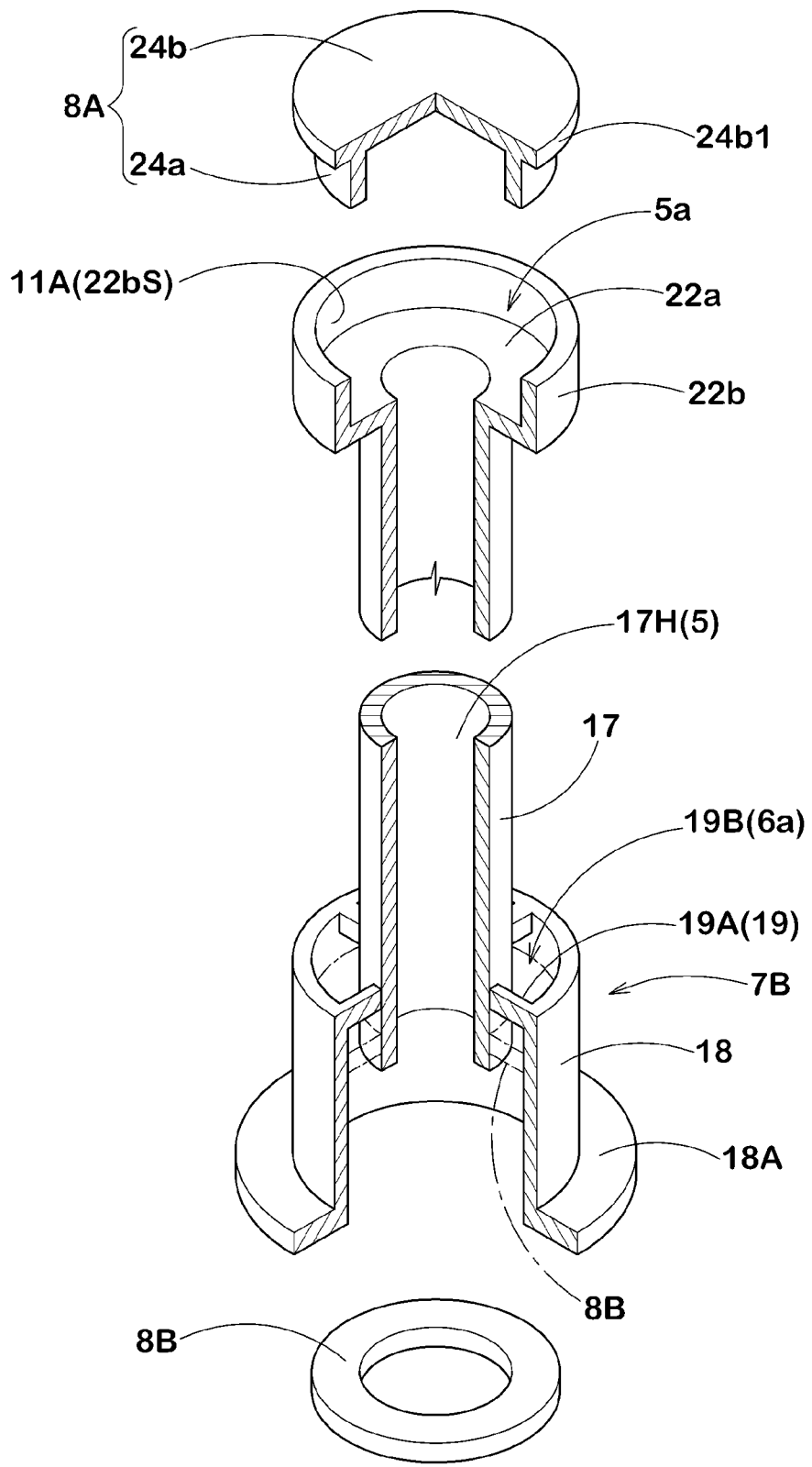
FIG. 3 is a perspective view of the main part of the cap unit.

The second cap body portion 7B is to be coupled with the first cap body portion 7A and constitutes part of the boss portion 11. Specifically, as shown in FIGS. 2 and 3, the second cap body portion 7B includes an inner pipe portion 17 whose lower end is coupled with the base pipe portion 12, and an outer pipe portion 18 spaced radially outward of the inner pipe portion 17 and disposed coaxially therewith. The inner pipe portion 17 and the outer pipe portion 18 are integrally coupled by a coupling portion 19. The coupling portion 19 includes a plurality of coupling ribs 19A radiating outward in the radial direction of the coupling portion 19 and extending from the inner pipe portion 17.

A flange-shaped leg piece 18A to be mounted and held on the bottom surface 10S is disposed at a lower end of the outer pipe portion 18. The leg piece 18A is disposed between the lower end of the mouth portion 4A of the bottle container 4 and the bottom surface 10S. This ensures stable securing of the second cap body portion 7B. A ring-shaped hole portion is defined between the outer pipe portion 18 and the inner pipe portion 17 and between the outer pipe portion 18 and the base pipe portion 12. The hole portion 20 and the hole portion 16 communicate with each other through the another end 16a. The upper end of the hole portion 20 communicates with a gap portion 19B between the coupling ribs 19A. Therefore in the present embodiment, the hole portion 20 and the hole portion 16 cooperate to define the second flow channel 6. The gap portion 19B defines the upper opening portion 6a of the second flow channel 6.

The second inner lid 8B is disposed at the hole portion 20. The second inner lid 8B of the present embodiment is in the shape of a ring made of an elastically deformable synthetic resin material, a rubber elastic material, or the like. The second inner lid 8B is to be tightly fitted to the outer peripheral surface of the inner pipe portion 17 and to the inner peripheral surface of the outer pipe portion 18. This ensures closing of the second flow channel 6. With an increase in the pressure of the bottle container 4, the second inner lid 8B is to be pressed downward to disengage and fall down from the inner pipe portion 17. This ensures opening of the second flow channel 6. A projection 21 is disposed on the bottom surface 10S. The projection 21 is to hold the second inner lid 8B thus disengaged and fell down so as not to close the opening of the another end 16a of the hole portion 16.

The inner pipe portion 17 cooperates with the base pipe portion 12 to define the boss portion 11. A center hole 17H of the inner pipe portion 17 and the hole portion 15 communicate with each other through the another end 15a. Accordingly in the present embodiment, the center hole 17H and the hole portion 15 cooperate to define the first flow channel 5. The upper opening portion 5a of the first flow channel 5 is defined at the upper end of the center hole 17H.

As shown in FIG. 3, the first inner lid securing portion 11A to permit the elastic fitting thereto of the first inner lid 8A is defined at an upper end portion of the inner pipe portion 17.

Figure 4A:
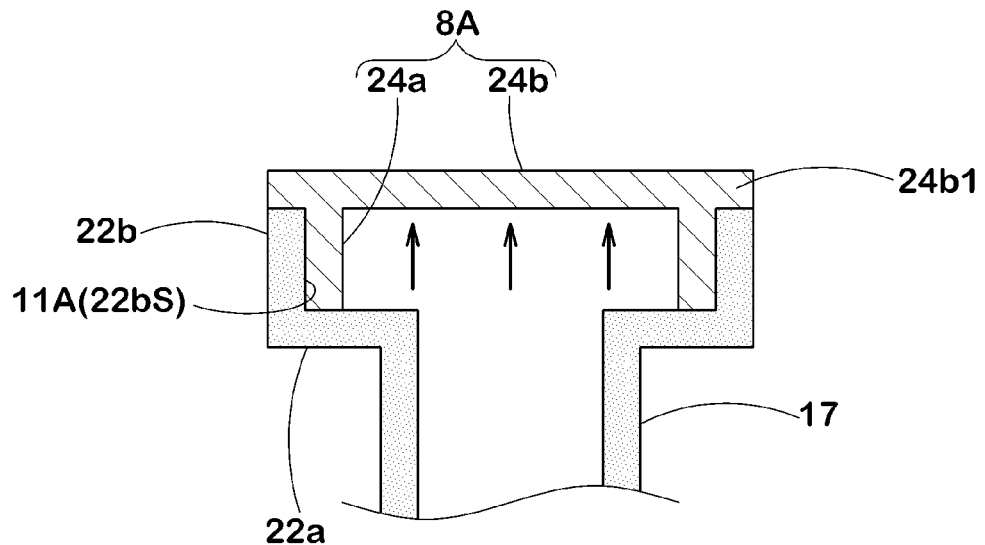
FIGS. 4(A) and 4(B) are cross-sectional views illustrating a situation where a first inner lid is disengaged.
Figure 4B:
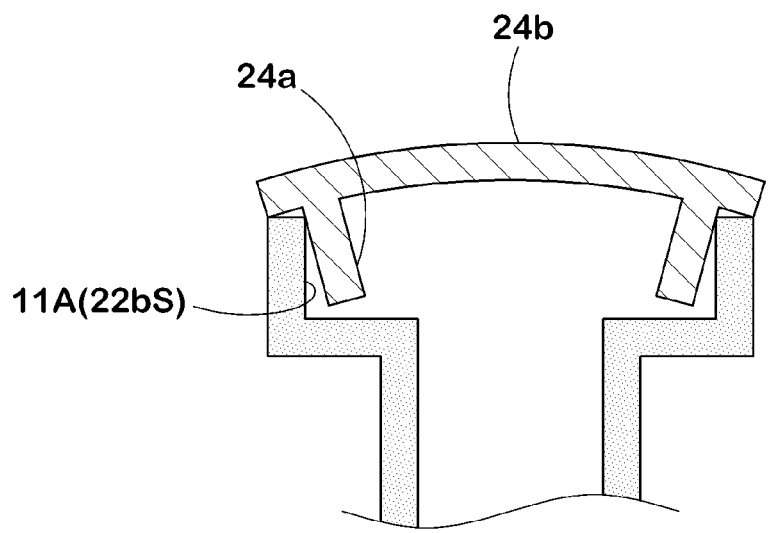

Specifically, with the present embodiment, the upper end portion of the inner pipe portion 17 is continuous with a large diameter portion 22b with a step portion 22a interposed therebetween as shown in FIG. 4. The first inner lid 8A of the present embodiment includes a fitting cylindrical portion 24a to be elastically fitted to an inner peripheral surface 22bS of the large diameter portion 22b, and a top plate portion 24b to close the upper end of the fitting cylindrical portion 24a. That is, with the present embodiment, the inner peripheral surface 22bS of the large diameter portion 22b defines the first inner lid securing portion 11A. The first inner lid 8A is fitted into an inner hole of the large diameter portion 22b. The top plate portion 24b includes a stopper portion 24b1 protruding further radially outward than the outer peripheral surface of the fitting cylindrical portion 24a. The stopper portion 24b1 is to be contacted with the upper end of the large diameter portion 22b, thereby positioning the first inner lid 8A.

Figure 5:
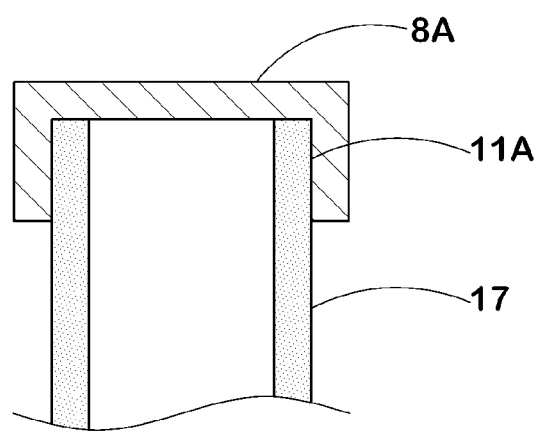
FIG. 5 is a cross-sectional view illustrating another example of the first inner lid.

The large diameter portion 22b thus disposed allows the first inner lid 8A to have an increased area to receive the internal pressure of the first flow channel 5. This ensures that a large upward force is exerted on the first inner lid 8A. Further, as exaggeratedly shown in FIG. 4B, by allowing the first inner lid 8A to be fitted into the inner hole of the large diameter portion 22b, the top plate portion 24b being subjected to the internal pressure is curvedly deformed into a convex shape, thereby weakening fitting force between the fitting cylindrical portion 24a and the inner peripheral surface 22bS of the large diameter portion 22b. Consequently, the first inner lid 8A is removable with a smaller pressure while ensuring that the pressure contact force of the first inner lid 8A remains the same during storage. However, it is possible on demand to define the first inner lid 8A so as to be externally fitted to the outer peripheral surface of the inner pipe portion 17 as shown in FIG. 5. Similarly to the second inner lid 8B, the first inner lid 8A is made of the elastically deformable synthetic resin material, the rubber elastic material, or the like.

Accordingly, in a stored state of the cap unit 1, the first and second flow channels 5 and 6 are respectively closed by the first and second inner lids 8A and 8B, thereby preventing the puncture repair agent T from flowing out into the first and second flow channels 5 and 6. During a puncture repair operation, the pressure of the first flow channel 5 increases with the compressed air from the compressor 3, so that the first inner lid 8A is disengaged to open the first flow channel 5. Thereafter, the pressure of the bottle container 4 increases with the compressed air entering therein from the first flow channel 5, so that the second inner lid 8B is depressed and disengaged to open the second flow channel 6 so as to charge the puncture repair agent T into the tire (t).

The first and second inner lids 8A and 8B are thus disposed independently, and the first and second inner lids 8A and 8B are sequentially removed with the compressed air. It is therefore ensured to relax the fitting precision for each of the inner lids 8A and 8B while preventing malfunctions due to liquid leakage during the storage, and due to the occasion that the inner lids do not disengage at the time of use.

As shown in FIG. 1, the upper opening portion 5a of the first flow channel 5 is preferably located higher than a liquid surface TS of the puncture repair agent T in the mounted state Y. The reason for this is as follows. If the compressor 3 is operated with the second flow channel 6 side closed, the pressure in the bottle container 4 is abnormally enhanced. When the compressor 3 is subjected to pulsation on that occasion, there occurs a risk that the puncture repair agent T in the bottle container 4 flows back toward the compressor 3. Hence, the above trouble is preventable by locating the upper opening portion 5a higher than the liquid surface TS. The state in which the second flow channel 6 side is closed can correspond to, for example, the case where the second inner lid 8B does not disengage due to a defect of the second inner lid 8B, the case where the hose 31 to be coupled with the tire coupling portion 14 is bent and blocked, or the case where the tip of the hose 31 is blocked by the cap.

The upper opening portion 6a of the second flow channel 6 is preferably located lower than the upper end of the mouth portion 4A. Thus, it is ensured to prevent the puncture repair agent T from remaining in the bottle container 4 after the puncture repair.

Figure 6:
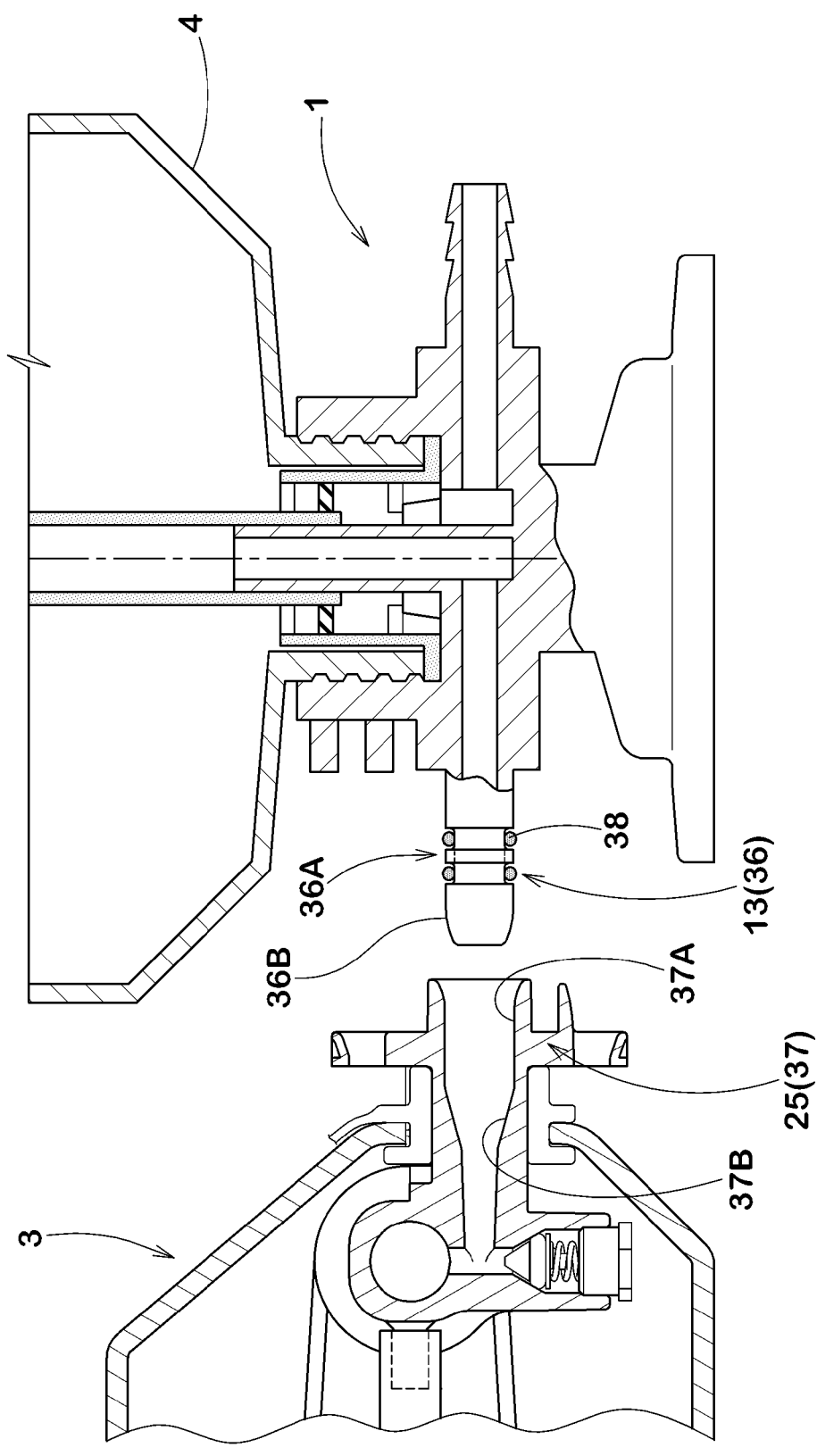
FIG. 6 is a cross-sectional view illustrating another example of the cap unit.
Figure 7:
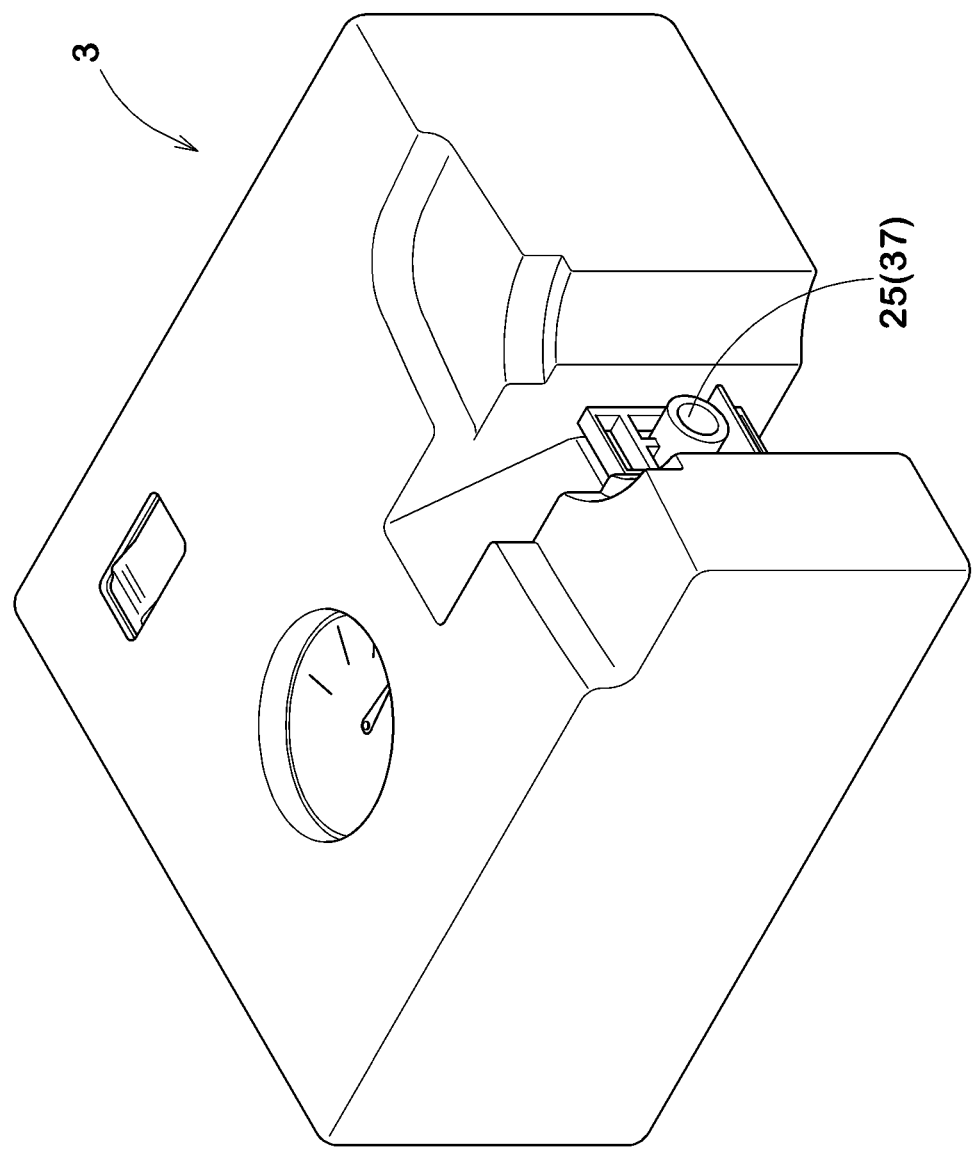
FIG. 7 is a perspective view illustrating an example of a compressor for use in the cap unit.
Figure 8:
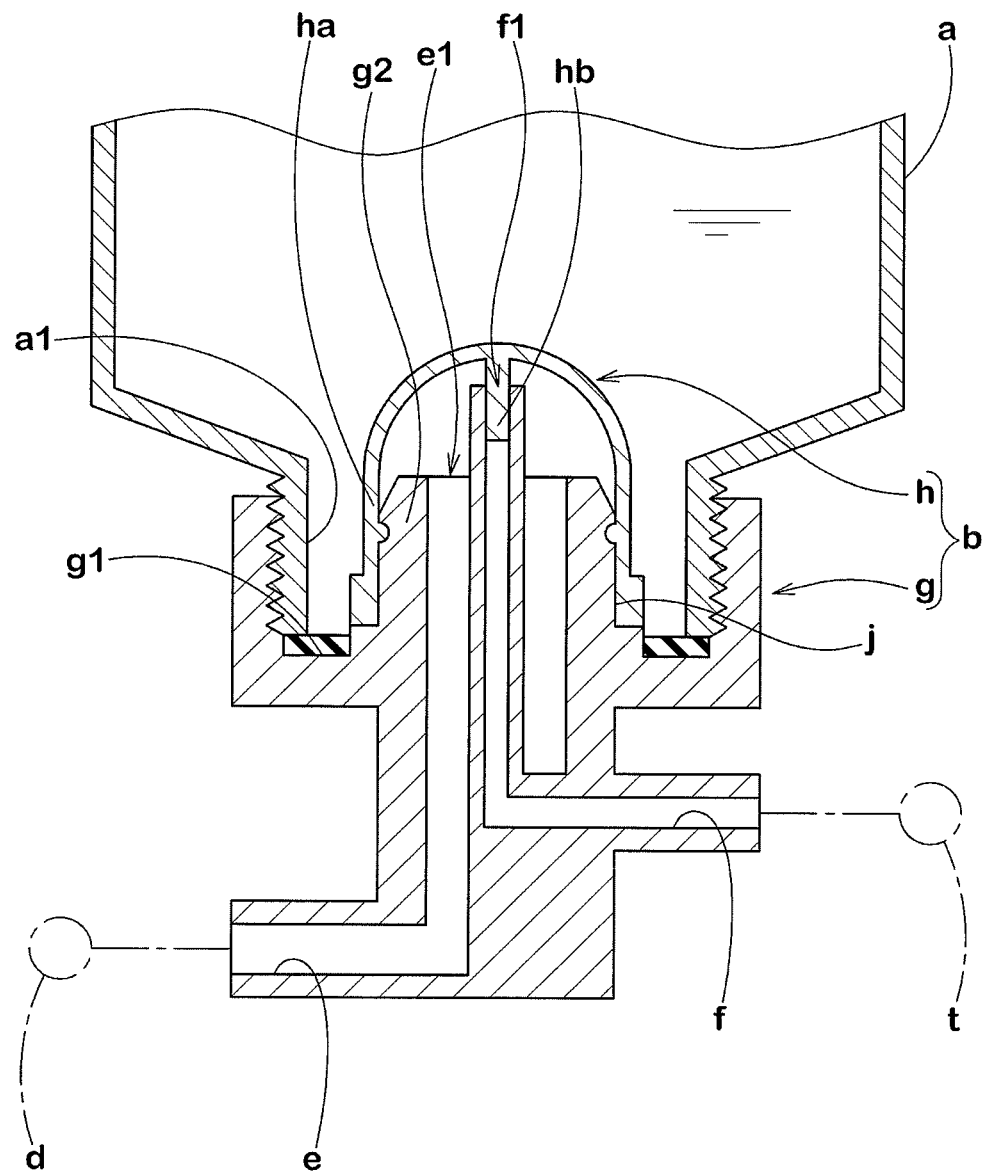
FIG. 8 is a cross-sectional view illustrating a convention cap unit.

The present embodiment illustrates the case where the cap unit 1 is coupled via the hose 31 with the compressor 3. However, as shown in FIGS. 6 and 7, the cap unit 1 and the compressor 3 may be directly coupled with each other without interposing the hose therebetween. This contributes to enhanced installment stability to prevent falling of the bottle container 4 during the puncture repair operation.

In this case, one of the compressor coupling portion 13 and the cap coupling portion 25 close to the compressor 3 serves as a coupling nozzle 36 projecting toward the other, and the other is defined as a nozzle receiver 37 that permits insertion therein of the coupling nozzle 36 so as to be tightly coupled with the nozzle receiver 37. The present embodiment illustrates the case where the compressor coupling portion 13 is defined as the coupling nozzle 36, and the cap coupling portion 25 is defined as the nozzle receiver 37.

The coupling nozzle 36 includes a tapered cone shaped tapered surface portion 36B on a front end side of a nozzle body 36A with a constant outer diameter. For example, two seal rings 38, such as O rings, are secured to the nozzle body 36A. The nozzle receiver 37 includes a fitting hole portion 37A to be air-tightly fitted via the seal rings 38 to the nozzle body 36A, and a tapered surface portion 37B disposed at the rear end of the fitting hole portion 37A. The tapered surface portion 37B has an inclination approximately identical to the inclination of the tapered surface portion 36B. The coupling nozzle 36 and the nozzle receiver 37 are coaxially aligned with each other by these tapered surface portions 36B and 37B.

While the particularly preferable embodiments of the present invention have been described in detail, the present invention is not limited to the illustrated embodiments, but can be modified and carried out in various aspects.

DESCRIPTION OF THE REFERENCE NUMERAL

1 Cap unit
3 Compressor
4 Bottle container
4A Mouth portion
5 First flow channel
5a Upper opening portion
6 Second flow channel
6a Upper opening portion
7 Cap body
8 Closing means
8A First inner lid
8B Second inner lid
10 Mouth portion securing recess
105 Bottom surface
11 Boss portion
11A First inner lid securing portion
T Puncture repair agent

The invention claimed is:

1. A cap unit for puncture repair, the cap unit comprising:
   a cap body attached to a mouth portion of a bottle container storing a puncture repair agent, and comprising
      a first flow channel configured to feed compressed air from a compressor into the bottle container,
      a second flow channel configured to sequentially take out the puncture repair agent and the compressed air from the bottle container by a feed of the compressed air,
      a first inner lid configured to close the first flow channel, and
      a second inner lid being defined independently of the first inner lid and configured to close the second flow channel,
   wherein, in a state that the bottle container is upside down, the cap body comprises
      a mouth portion securing recess allowing the mouth portion of the bottle container to be inserted into and secured to the mouth portion securing recess, and
      a boss portion extending upward from a bottom surface of the mouth portion securing recess, and having a center hole forming a part of the first flow channel,
      an upper end portion of the center hole is provided with an upper opening portion of the first flow channel,
      an upper end portion of the boss portion is provided with a large diameter portion through a step portion,
      an inner peripheral surface of the large diameter portion defines a first inner lid securing portion permitting elastic fitting of the first inner lid thereto;
   wherein the first inner lid comprises:
      a fitting cylindrical portion to be elastically fitted to the inner peripheral surface of the large diameter portion, and
      a top plate portion to close the upper end of the fitting cylindrical portion, and
   wherein an upper opening portion of the second channel is provided radially outward of the boss portion.

2. The cap unit for puncture repair according to claim 1, wherein the top plate portion includes a stopper portion protruding further radially outward than the outer peripheral surface of the fitting cylindrical portion so as to be contacted with the upper end of the large diameter portion.

3. The cap unit for puncture repair according to claim 1, wherein the boss portion comprises a base pipe portion extending upward from the bottom surface of the mouth portion securing recess, and an inner pipe portion whose lower end is coupled with the base pipe portion,
   the cap body further comprises an outer pipe portion disposed coaxially with the inner pipe portion, and a coupling portion coupling the inner pipe portion and an upper end of the outer pipe portion,
   a ring-shaped hole portion forming a part of the second flow channel is provided between the boss portion and the outer pipe portion, and
   the upper opening portion of the second flow channel is open on the coupling portion.

4. The cap unit for puncture repair according to claim 2, wherein the second inner lid is in the shape of a ring, and is disposed at the hole portion to be tightly fitted to the outer peripheral surface of the inner pipe portion and to the inner peripheral surface of the outer pipe portion.

5. The cap unit for puncture repair according to claim 4, wherein a projection is disposed on the bottom surface of the mouth portion securing recess so as to hold the second inner lid disengaged from the inner pipe portion.

* * * * *